No. 11,703. Reissued Nov. 29, 1898.
G. H. DUNLOP.
WALL OR LINING FOR SHIELD TUNNELING.
(Application filed Aug. 12, 1898.)
Fig. 1.
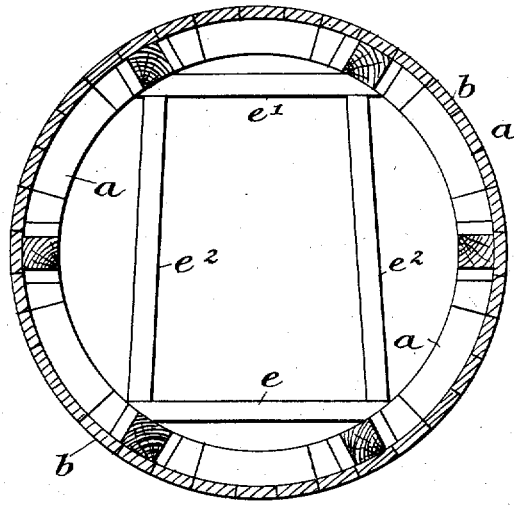
Fig. 2.
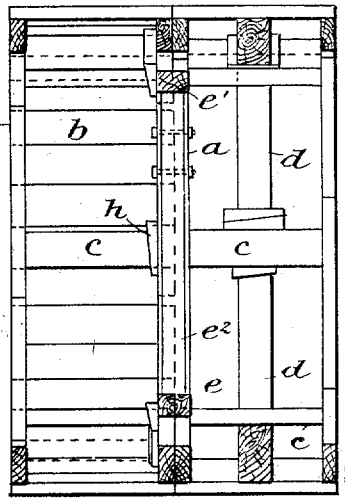
Fig. 3.
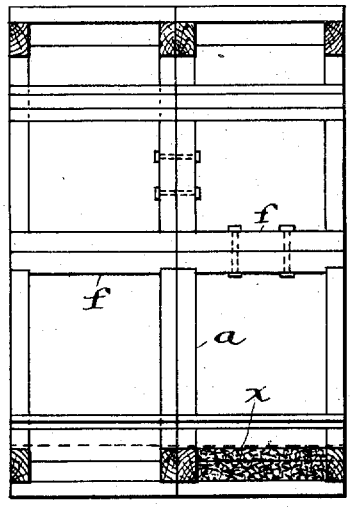
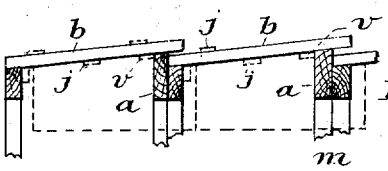
Fig. 4.
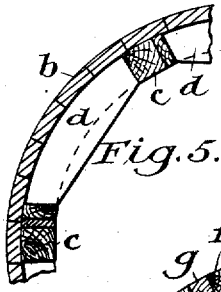
Fig. 5.
Fig. 7.
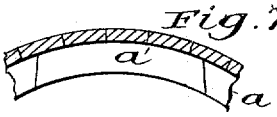
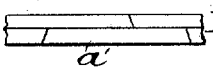
Fig. 8.
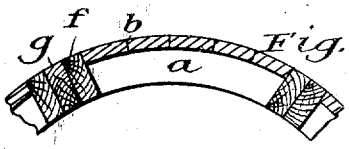
Fig. 6.
Fig. 9.
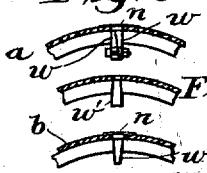
Fig. 9a
Fig. 9b
WITNESSES:
C. R. Bolton
O. D. Munn
INVENTOR
George Henry Dunlop
BY
Howard & Howard
ATTORNEYS

UNITED STATES PATENT OFFICE.

GEORGE HENRY DUNLOP, OF SOUTH MELBOURNE, VICTORIA.

WALL OR LINING FOR SHIELD-TUNNELING.

SPECIFICATION forming part of Reissued Letters Patent No. 11,703, dated November 29, 1898.

Original No. 595,702, dated December 21, 1897. Application for reissue filed August 12, 1898. Serial No. 688,462.

*To all whom it may concern:*

Be it known that I, GEORGE HENRY DUNLOP, civil engineer, a subject of the Queen of Great Britain and Ireland, and a resident of No. 139 Bridport street, South Melbourne, in the British Colony of Victoria, have invented a certain new and useful Improved Wall or Lining for Shield-Tunneling and for Shaft-Sinking, of which the following is a specification.

This invention relates to an improved wall or lining for "shield-tunneling" and for shaft-sinking, the invention being applicable also to ordinary tunneling. By the adoption of this method in shield-tunneling it is not necessary to follow the shield with metal cylinders or masonry or other similar material as is now usually done, as I employ the ordinary shield and follow it closely with strong wooden lining of the outer form of the tunnel or shield built of sections or segments forming rings and provided when requisite with continuous lines of horizontal struts strong enough to form resistance posts or bearers for the pressure of the hydraulic rams by which the shield is forced forward. The rings or consecutive lengths of lining are built either partly or wholly within the tail or rear end of the shield or closely following the rear end of the shield. The aforesaid wooden linings may form either a temporary or a permanent lining or wall to the excavation or tunnel, or they may be left at their position and be covered with the necessary thickness of concrete or masonry, &c., to complete the tunnel, or the linings are put together in such a manner that a great portion of the timber, such as the segmental ribs, can be removed before building such masonry-lining. When tunneling, to prevent distortion of the lining through heavy pressure or running ground a "set" or framing of timber is built between the ribs or linings to resist any such undue pressure. The whole of the parts forming the linings are secured together by bolts, nails, cleats, iron timber-dogs, or by other usual fastenings.

In the attached drawings, Figure 1 is an end view of the wood lining or wall and showing the set in position; and Fig. 2, a longitudinal sectional view of two connected lining or wall rings, one of which shows the laggings complete and also showing the set. Fig. 3 is a similar view to Fig. 2, but showing the segmental linings provided with longitudinal flanges which may take the place of the struts; Fig. 4, a part longitudinal section of the linings when the ends of laggings overlap; Fig. 5, a part end view of linings, showing the rings strengthened by intermediate segments; and Fig. 6 is also a part end view showing the key-piece employed for closing the joint of the type of linings shown in Fig. 3. Figs. 7 and 8 show tapering "key-segments" to facilitate removal of the ribs shown in Fig. 4, while Figs. 9, $9^a$, and $9^b$ show alternative arrangements of wedges for the wood lining when the ribs are to be removed.

As shown in the drawings, each "ring" or length of tunnel-lining in its simplest form consists of the circumferential laggings and their supporting-ribs, *a a* being the ribs, each composed of a suitable number of segments formed of one or more layers or plies of wood, and *b b* the boards or laggings, supported at or near their ends by said ribs and when in position forming the outer tunnel-lining.

*c c* are the struts or thrust-blocks, one or more of which is placed opposite each ram of the shield to bear and distribute the pressure when shoving the shield; also, the struts form braces for the segments.

The space between the ribs *a a*, Fig. 3, may be filled with concrete, brickwork, or masonry *x*, such masonry serving to strengthen the lining and to resist the thrust of the hydraulic rams in conjunction with or in substitution for the thrust-blocks. This filling of masonry would usually be put in position after each ring of wood lining is erected and before the shield is moved forward again.

In shield-tunneling with lining, as shown in Fig. 2, when the thrust-blocks *c c* are not used the head of the ram will be so formed as to bear on the ends of the laggings when shoving the shield.

*d d*, Figs. 2 and 5, are segments, either temporary or permanent, securely wedged between the struts *c*, and thus forming a complete or part ring intermediate to the ribs *a*. Said segments *d* may only be required when the laggings or ribs are being unduly strained.

*f f*, Figs. 3 and 6, are longitudinal pieces, which may be used to form connecting-pieces between the ends of rib-segments; also, they may be used with or take the place of the thrust-blocks *c c*. These pieces may be either as deep radially as the rib and laggings, as in Fig. 6, or as deep as the rib only, the laggings in this case being continuous around each ring.

*g* is a key consisting of a piece, either rectangular or tapering, of the length of the ring for keying plates or portions of rings having the longitudinal pieces *f f* or where the shield is too small to allow the ring to be completed with ordinary segments alone.

The set is composed of the sill *e*, cap *e'*, and legs $e^2$, and it is built within the linings when further strength is required or to prevent the deformation of the linings until the vacuity left by the shield outside of the laggings has been filled by grouting or by the closing in of the unsupported earth at the sides of the tunnel. This set may be extended by additional struts to further strengthen large tunnel-linings.

In tunnels where the ribs *a a* are removed wholly or for part of the ring before the concrete or other masonry is built in the rib at one end of each ring is smaller in diameter than the rib at the other end and the laggings overlap, as shown in Fig. 4, throughout the whole ring or for such part as the ribs are to be removed, and in this system the concrete or masonry is placed in position, as shown by dotted lines *m* in Fig. 4, in lengths equal to the ring lengths and ending close to the smaller rib, and which latter and the adjoining large rib may then be removed after the laggings are covered with concrete or masonry, the laggings at the one end of the unlined ring being temporarily supported by the end of the laggings of the concreted ring which they overlap.

When the ribs *a*, as shown in Fig. 4, are to be removed, smaller ribs *v* or hoop-iron or bent strips of wood *j*, not requiring to be removed, may have the laggings spiked or nailed to them, and these ribs *v* or strips *j* or the laggings so nailed to them may be temporarily fastened to the main large ribs which are to be removed. One of the segment-pieces *a'* of each complete rib may be of a tapering form, as shown in Figs. 7 and 8, to facilitate removal.

An alternative arrangement of striking wedges for the wood lining when the ribs are to be removed is shown in Figs. 9, $9^a$, and $9^b$, *w w* being a pair of wedges, Fig. 9, or *w'*, Figs. $9^a$ and $9^b$, single wedges. The laggings at this joint may overlap, so as to be in contact when the ribs and wedges are in position, as in Fig. $9^a$, or a strip of metal or other material, as *n*, Figs. 9 and $9^b$, may be nailed to the laggings on one rib, such strip to be of sufficient width to span the jointing wedge or wedges and to cover a portion of the laggings on the other rib. These wedges will be temporarily secured by nailing, by cleats, or by iron timber-dogs or the like.

Where the rib parts only of segments of each ring are to be removed, the remaining portion, which will usually be the lower portion, may have the laggings butt-jointed, as shown at Figs. 2 and 3.

Wedges *h*, Fig. 2, for, if necessary, adjusting the ring lengths and afterward for facilitating the withdrawal of the thrust-blocks, may be placed at the end of each block. The rib-segments of adjoining rings may be bolted together, as shown in Fig. 2; also, the longitudinal pieces of each ring may be bolted together (see Fig. 3) when such pieces are used.

This system may in some instances be applicable when the shield is not used, either where the ground is sufficiently firm to stand unsupported for the length and for the time necessary for inserting a ring of lining or where the ground is wholly or partly supported by compressed air or by temporary timbering or other lining.

This system of lining may be applied to shaft-sinking in a similar manner to tunneling, either with or without a shield or "box," in advance of the lining.

Having now described my invention, what I claim as new, and desire to secure by Letters Patent, is—

1. A wooden wall or lining for tunneling and for shaft-sinking, composed of ribs as *a* and laggings as *b* and struts as *c* having a strengthening set as *e*, *e'*, $e^2$, longitudinal pieces as *f*, all secured together and arranged, substantially as herein described and shown in the drawings.

2. In shield-tunneling, and for shaft-sinking, a wall or lining consisting of ribs *a* laggings *b* and masonry *x* and struts as *c* built substantially as described and shown in the drawings.

3. A wooden wall or lining for tunneling and for shaft-sinking, consisting of the rings each made up of ribs at each end, one rib being smaller than the other and the overlapping laggings carried by the ribs, substantially as described.

4. In combination in a wooden wall or lining for tunneling and for shaft-sinking, the ribs *a*, the laggings *b* and the struts *c*, said struts being arranged between the ribs.

5. A wooden wall or lining for tunneling and for shaft-sinking, comprising a series of rings, said rings being built up progressively and composed of a series of segments, each segment being made up of parallel curved ribs and laggings connecting them, the ribs of adjacent rings being in contact and secured together, substantially as described.

In witness whereof I have hereunto set my hand in presence of two witnesses.

GEORGE HENRY DUNLOP.

Witnesses:
BEDLINGTON BODYCOMB,
W. J. S. THOMPSON.